(12) United States Patent
Muto et al.

(10) Patent No.: US 11,958,480 B2
(45) Date of Patent: Apr. 16, 2024

(54) ELECTRONIC CONTROL DEVICE AND OPERATION METHOD

(71) Applicant: Hitachi Automotive Systems, Ltd., Hitachinaka (JP)

(72) Inventors: Yuta Muto, Tokyo (JP); Akira Kuriyama, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 795 days.

(21) Appl. No.: 17/049,220

(22) PCT Filed: Apr. 12, 2019

(86) PCT No.: PCT/JP2019/016010
§ 371 (c)(1),
(2) Date: Oct. 20, 2020

(87) PCT Pub. No.: WO2019/208271
PCT Pub. Date: Oct. 31, 2019

(65) Prior Publication Data
US 2021/0256328 A1    Aug. 19, 2021

(30) Foreign Application Priority Data
Apr. 25, 2018   (JP) .................................. 2018-084266

(51) Int. Cl.
*B60W 30/095*     (2012.01)
*G06F 18/22*      (2023.01)
(Continued)

(52) U.S. Cl.
CPC ......... *B60W 30/0956* (2013.01); *G06F 18/22* (2023.01); *G06F 18/251* (2023.01);
(Continued)

(58) Field of Classification Search
CPC .............................................. B60W 30/0956
See application file for complete search history.

(56) References Cited

U.S. PATENT DOCUMENTS 9,390,624 B2 * 7/2016 Minemura ............ G01S 13/867
10,019,004 B2 * 7/2018 Takahashi ............ G07C 5/0808
(Continued)

FOREIGN PATENT DOCUMENTS

JP          7-125567 A      5/1995
JP       2010-176669 A      8/2010
(Continued)

OTHER PUBLICATIONS

International Search Report (PCT/ISA/210) issued in PCT Application No. PCT/JP2019/016010 dated Jul. 16, 2019 with English translation (four (4) pages).
(Continued)

*Primary Examiner* — Michael A Berns
(74) *Attorney, Agent, or Firm* — Crowell & Moring LLP

(57) ABSTRACT

An electronic control device comprises a sensor information acquisition unit which acquires state quantities including a position of an object to be measured using an output of a plurality of sensors, or calculates the state quantities of the object to be measured by using the output of the plurality of sensors, a storage unit which stores position determination information as a condition of a classification related to the position, a position determination unit which classifies the object to be measured by using the position determination information, and a fusion unit which determines, by referring to the state quantities, a match among a plurality of the objects to be measured which are classified identically by the position determination unit and which were measured by different sensors, and fuses the positions of the plurality of objects to be measured determined to be a match, wherein the objects to be measured are objects that can be measured by each of the plurality of sensors.

10 Claims, 13 Drawing Sheets

(51) Int. Cl.
*G06F 18/25* (2023.01)
*G06V 10/22* (2022.01)
*G06V 10/75* (2022.01)
*G06V 10/80* (2022.01)
*G06V 20/56* (2022.01)
*G06V 20/58* (2022.01)

(52) U.S. Cl.
CPC ............ *G06F 18/256* (2023.01); *G06V 10/22* (2022.01); *G06V 10/751* (2022.01); *G06V 10/811* (2022.01); *G06V 20/56* (2022.01); *G06V 20/58* (2022.01)

(56) References Cited

U.S. PATENT DOCUMENTS

| | | | |
|---|---|---|---|
| 10,730,503 B2 * | 8/2020 | Okada | .................... G08G 1/165 |
| 10,866,316 B2 * | 12/2020 | Takaki | .................. G01S 7/4026 |
| 2014/0297171 A1 | 10/2014 | Minemura et al. | |
| 2017/0277183 A1 | 9/2017 | Takahashi et al. | |
| 2017/0313297 A1 | 11/2017 | Okada et al. | |
| 2021/0256328 A1 * | 8/2021 | Muto | ................... G06V 10/811 |

FOREIGN PATENT DOCUMENTS

| | | | |
|---|---|---|---|
| JP | 2010-244474 A | 10/2010 |
| JP | 2010-249613 A | 11/2010 |
| JP | 2014-6123 A | 1/2014 |
| JP | 2014-197325 A | 10/2014 |
| JP | 2016-99635 A | 5/2016 |
| JP | 2017-182771 A | 10/2017 |

OTHER PUBLICATIONS

Japanese-language Written Opinion (PCT/ISA/237) issued in PCT Application No. PCT/JP2019/016010 dated Jul. 16, 2019 (four (4) pages).
Japanese-language Office Action issued in Japanese Application No. 2018-084266 dated Jul. 6, 2021 with English translation (nine (9) pages).

* cited by examiner

| POST-PROCESSING TABLE | | | |
|---|---|---|---|
| NEW ID | ORIGINAL ID | POSITION | VELOCITY |
| A001 | B002, B008, B010 | (r7, θ7) | (v71, v72) |
| A002 | B005, B007 | (r8, θ8) | (v81, v82) |
| . | . | . | . |

| FIRST AREA TABLE | | | | |
|---|---|---|---|---|
| ID | ACQUISITION SENSOR | POSITION | VELOCITY | MATCHING |
| B002 | LEFT RADAR | (r2, θ2) | (v21, v22) | NOT YET MATCHED |
| B005 | LEFT CAMERA | (r5, θ5) | (v51, v52) | NOT YET MATCHED |
| . | . | . | . | . |

FIG. 10

PATTERN DETERMINATION TABLE — 3214

| CONDITION | AREA PATTERN |
|---|---|
| ILLUMINANCE E < Ea | PATTERN B |
| WIPER SWITCH ON | PATTERN C |
| LEFT CAMERA VELOCITY IS DISCONTINUOUS | PATTERN D |
| LEFT CAMERA FAILURE | PATTERN D |
| . . | . . |
| OTHER THAN ABOVE | PATTERN A |

FIG. 11

AREA DETERMINATION TABLE — 3211A

| COORDINATE CONDITION | | | AREA NUMBER |
|---|---|---|---|
| PATTERN A | PATTERN B | . . | |
| R1a < R < R1A & θ1a < θ < θ1A | R1b < R < R1B & θ1b < θ < θ1B | . . | Z1 |
| R2a < R < R2A & θ2a < θ < θ2A | R2b < R < R2B & θ2b < θ < θ2B | . . | Z2A |
| . . | . . | . . | . . |
| R3a < R < R3A & θ3a < θ < θ3A | R3b < R < R3B & θ3b < θ < θ3B | . . | Z3 |

FIG. 12

| SENSOR AREA ASSOCIATION INFORMATION | |
|---|---|
| AREA | SENSOR |
| Z1 | LEFT CAMERA, LEFT RADAR |
| Z2A | LEFT CAMERA, LEFT RADAR |
| Z2B | LEFT CAMERA, RIGHT RADAR |
| Z2C | LEFT CAMERA, RIGHT CAMERA |
| Z2D | RIGHT CAMERA, LEFT RADAR |
| Z2E | RIGHT CAMERA, RIGHT RADAR |
| Z2F | LEFT RADAR, RIGHT RADAR |
| Z3 | RIGHT CAMERA, RIGHT RADAR |

| FUTURE AREA DETERMINATION TABLE ||
|---|---|
| COORDINATE CONDITION | AREA NUMBER |
| $R1aF < R < R1AF$ & $\theta1aF < \theta < \theta1AF$ | Z1 |
| $R2aF < R < R2AF$ & $\theta2aF < \theta < \theta2AF$ | Z2 |
| $R3aF < R < R3AF$ & $\theta3aF < \theta < \theta3AF$ | Z3 |

| FUTURE TABLE ||||
|---|---|---|---|
| NEW ID | FUTURE POSITION | FUTURE VELOCITY | FUTURE AREA |
| A001 | (Fr7, Fθ7) | (Fv71, Fv72) | Z2 |
| A002 | (Fr8, Fθ8) | (Fv81, Fv82) | Z2 |
| . | . | . | . | ically
ELECTRONIC CONTROL DEVICE AND OPERATION METHOD

TECHNICAL FIELD

The present invention relates to an electronic control device and an operation method.

BACKGROUND ART

In recent years, the development of autonomous driving of vehicles is being actively conducted. With autonomous driving, the measurement results of a plurality of sensors are often used by being combined. PTL 1 discloses a preceding vehicle detection mechanism of a driving control device of a vehicle which recognizes a preceding vehicle by performing image processing to images obtained by capturing circumstances in front of one's vehicle based on a camera means, and controls an engine output so as to cause the vehicle to run while following the preceding vehicle, wherein the preceding vehicle detection mechanism comprises a laser radar which detects a position of an object existing in front of one's vehicle by emitting a laser beam from one's vehicle in a forward direction while scanning an area in a horizontal plane and receiving the reflected laser beam, and an image processing means which, upon performing image processing to the images and recognizing the preceding vehicle, sets a processing area within a screen corresponding to the position of the object detected with the laser radar, and recognizes the preceding vehicle by performing image processing only to the images of the processing area.

CITATION LIST

PATENT LITERATURE

[PTL 1] Japanese Unexamined Patent Application Publication No. H7-125567

SUMMARY OF THE INVENTION

PROBLEMS TO BE SOLVED BY THE INVENTION

With the invention described in PTL 1, the computational amount will be enormous when there are multiple objects to be measured.

MEANS TO SOLVE THE PROBLEMS

According to the 1st aspect of the present invention, an electronic control device, comprises: a sensor information acquisition unit which acquires state quantities including a position of an object to be measured using an output of a plurality of sensors, or calculates the state quantities of the object to be measured by using the output of the plurality of sensors; a storage unit which stores position determination information as a condition of a classification related to the position; a position determination unit which classifies the object to be measured by using the position determination information; and a fusion unit which determines, by referring to the state quantities, a match among a plurality of the objects to be measured which are classified identically by the position determination unit and which were measured by different sensors, and fuses the positions of the plurality of objects to be measured determined to be a match, wherein the objects to be measured are objects that can be measured by each of the plurality of sensors.

According to the 2nd aspect of the present invention, an operation method to be executed by an electronic control device comprising a sensor information acquisition unit which acquires state quantities including a position of an object to be measured using an output of a plurality of sensors, or calculates the state quantities of the object to be measured by using the output of the plurality of sensors, and a storage unit which stores position determination information as a condition of a classification related to the position, comprising: classifying the object to be measured by using the position determination information; and determining, by referring to the state quantities, a match among a plurality of the objects to be measured which are classified identically based on the classification and which were measured by different sensors, and fusing the positions of the plurality of objects to be measured determined to be a match, wherein the objects to be measured are objects that can be measured by each of the plurality of sensors.

ADVANTAGEOUS EFFECTS OF THE INVENTION

According to the present invention, the computational amount can be reduced.

BRIEF DESCRIPTION OF DRAWINGS

FIG. 5 is a diagram showing an example of the post-processing table 3213.

FIG. 6 is a diagram showing an example of the first area table 3221A.

FIG. 10 is a diagram showing an example of the pattern determination table 3214.

FIG. 11 is a diagram showing an example of the area determination table 3211A in the second embodiment.

FIG. 12 is a diagram showing an example of the sensor area association information 3217.

FIG. 15 is a diagram showing an example of the future area determination table 3215.

FIG. 16 is a diagram showing an example of the future table 3216.

DESCRIPTION OF EMBODIMENTS

First Embodiment

The first embodiment of the electronic control device according to the present invention is now explained with reference to FIG. 1 to FIG. 8.

(Configuration Diagram)

Figure 1:
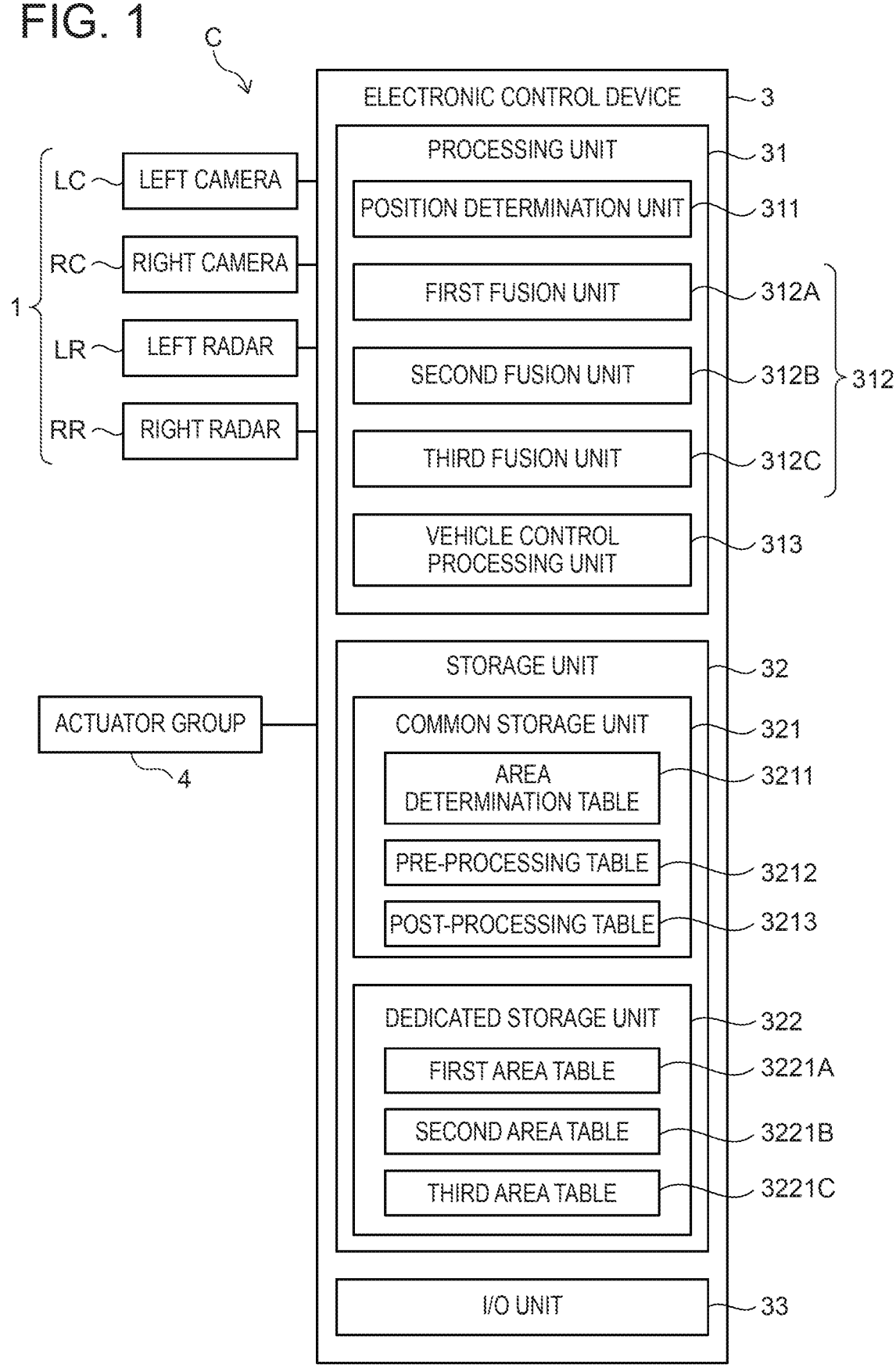
FIG. 1 is a configuration diagram of the vehicle C.

FIG. 1 is a configuration diagram of the vehicle C. The vehicle C comprises a sensor group 1, an electronic control device 3, and an actuator group 4. The sensor group 1 and the actuator group 4 are connected to the electronic control device 3.

The sensor group 1 is configured from two or more sensors, for example, a left camera LC, a right camera RC, a left radar LR, and a right radar RR. The left camera LC is a camera that captures the left front of the vehicle C, and the right camera RC is a camera that captures the right front of the vehicle C. The left radar LR is a radar such as a millimeter wave radar that measures an obstacle in the left front of the vehicle C, and the right radar RR is a radar such as a millimeter wave radar that measures an obstacle in the right front of the vehicle C.

The respective sensors configuring the sensor group 1 acquire information of an object to be measured, which is an object that can be measured by each of the sensors, and calculates the position and the velocity of the object to be measured from the acquired information. Subsequently, the respective sensors output the position and the velocity, as state quantities, to the electronic control device 3. However, the state quantity may include information other than the position and the velocity, for example, the state quantity may also include the angular velocity. For example, the left camera LC and the right camera RC respectively analyze captured images that were obtained, and calculate the position and the velocity of the object to be measured from the continuity of luminance and saturation, and the time series variation thereof. For example, the left radar LR and the right radar RR respectively calculate the position and the velocity of the object to be measured from the continuity of distance and the time series variation thereof. The respective sensors may output the position of the object to be measured with the respective sensors as the reference, or the electronic control device 3 as the reference.

Note that the "object to be measured" will differ depending on the sensor, and, even when the measurable ranges of a plurality of sensors overlap, there will be an object that can be measured only with a certain sensor. Moreover, among the objects to be measured, there are those which will not obstruct the travel of the vehicle, such as smoke. Even with an object like smoke that will not obstruct the travel of the vehicle C, by measuring such object with a sensor capable of measuring that object, it will contribute to comprehending the ambient environment.

Figure 2A:
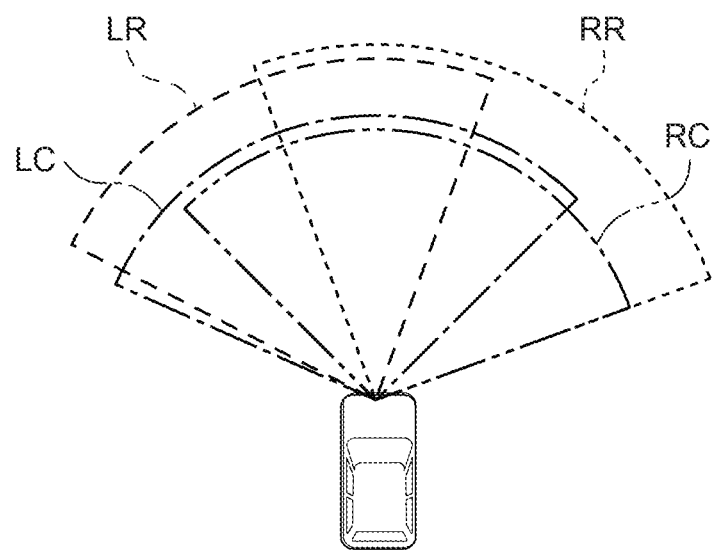
FIG. 2A is a diagram showing the data acquisition area of the sensor group 1.
Figure 2B:
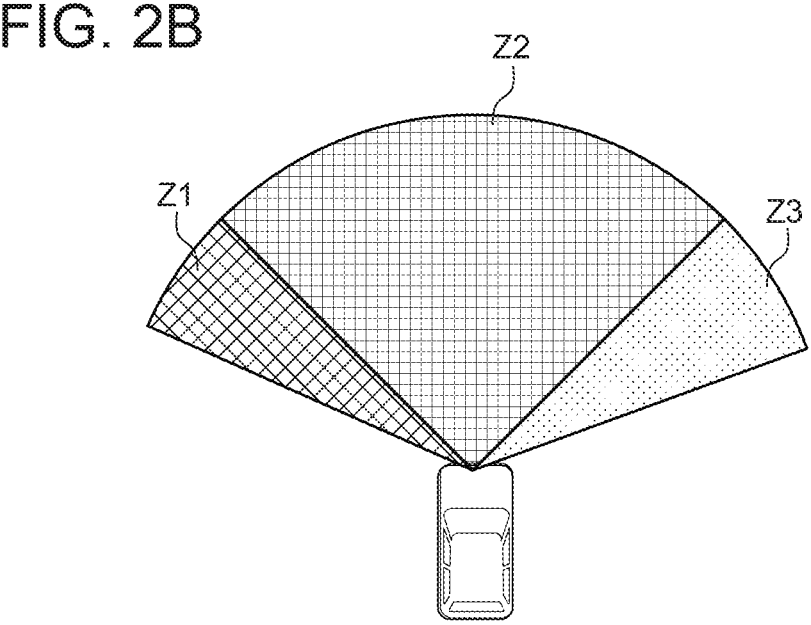
FIG. 2B is a perspective view of the defined areas.

FIG. 2(a) is a diagram showing the data acquisition area of the sensor group 1, and FIG. 2(b) is a perspective view of the defined areas. However, in FIG. 2(a), the reference numeral of the corresponding sensor is assigned to the data acquisition area of each sensor. As shown in FIG. 2(a), the data acquisition areas of the left camera LC and the left radar LR overlap on the left side of the diagram, the data acquisition areas of two to four sensors overlap near the center of the diagram, and the data acquisition areas of the right camera RC and the right radar RR overlap on the right side of the diagram.

In this embodiment, the three areas of Z1 to Z3 are defined as shown in FIG. 2(b). The first area Z1 is an area where the data acquisition areas of the left camera LC and the left radar LR overlap. The second area Z2 is an area where the data acquisition areas of two to four sensors overlap. The third area Z3 is an area where the data acquisition areas of the right camera RC and the right radar RR overlap. However, the respective sensors may also acquire data of areas that are broader than the data acquisition areas shown in FIG. 2(a). In the foregoing case, information acquired by sensors outside the range shown in FIG. 2(a) may be considered or ignored. For example, when the position of the object to be measured acquired by the right camera RC is the first area Z1, processing may be performed by giving consideration to the information of that object to be measured, or by ignoring such information. The explanation is now continued by returning to FIG. 1.

The actuator group 4 is a plurality of actuators which control the direction or the velocity of the vehicle, and includes, for example, a steering wheel, a brake, and an accelerator. The actuator group 4 is operated based on an operation command of the electronic control device 3. However, the actuator group 4 may also be operated based on the user's operation.

The electronic control device 3 is an electronic control unit comprising a processing unit 31, a storage unit 32, and an I/O unit 33. The processing unit 31 comprising a CPU which is a central processing unit, a ROM which is a read only memory, and a RAM which is a random access memory, and the following functions are realized by the CPU loading the programs stored in the ROM into the RAM and executing such programs. The processing unit 31 comprises, as its functions, a position determination unit 311, a fusion unit 312, and a vehicle control processing unit 313. These functions will be described later. The I/O unit 33 is a communication interface which communicates with the sensor group 1 and the actuator group 4. The I/O unit 33 is compliant with a communication standard such as a CAN (registered trademark) or IEEE802.3.

The fusion unit 312 comprises a first fusion unit 312A in which the first area Z1 is the processing target, a second fusion unit 312B in which the second area Z2 is the processing target, and a third fusion unit 312C in which the third area Z3 is the processing target. The fusion unit 312 determines whether the objects to be measured in which state quantities were acquired from different sensors are a match, and fuses the state quantities of the plurality of objects to be measured determined to be a match. In the following explanation, the objects to be measured in which the state quantities have been fused are referred to as the "fused objects to be measured". Moreover, a sensor to be excluded from the processing target in the sensor group 1 may also be preset for each fusion unit 312. For example, the first fusion unit 312A may process only the objects to be measured of the left camera LC and the left radar LR, and preset the right camera RC and the right radar RR as the sensors to be excluded from the processing target.

The storage unit 32 is a non-volatile storage device such as a flash memory. The storage unit 32 is divided into a common storage unit 321 that can be referenced from the overall processing unit 31, and a dedicated storage unit 322 which can be read from or written into only by each fusion unit 312. The common storage unit 321 and the dedicated storage unit 322 may be realized with the same hardware, or realized with different hardware. The common storage unit 321 stores an area determination table 3211, a pre-processing table 3212, and a post-processing table 3213.

The dedicated storage unit 322 stores a first area table 3221A which is read from or written into only by the first fusion unit 312A, a second area table 3221B which is read from or written into only by the second fusion unit 312B, and a third area table 3221C which is read from or written into only by the third fusion unit 312C. Note that, in this embodiment, in the sense that there is no need to refer to information of another area in the processing of a specific area, for example, provided is the explanation that "the first area table 3221A is read from or written into only by the first fusion unit 312A". Thus, in this embodiment, the first area table 3221A does not require any special access restriction means, such as a permission setting or a locking mechanism.

(Area Determination Table 3211)

Figure 3:
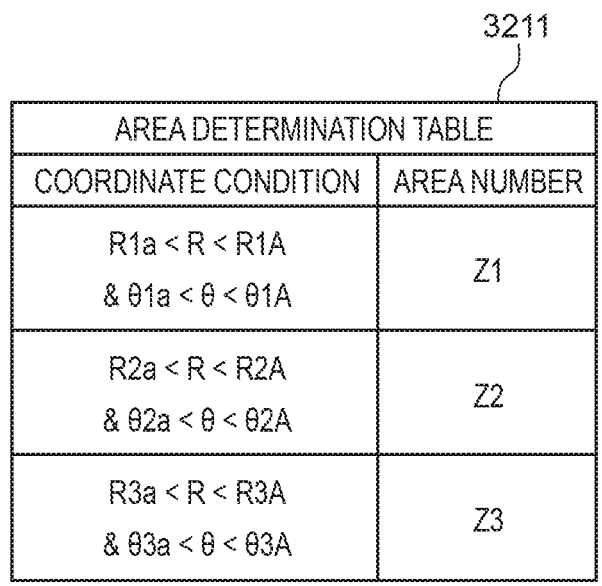
FIG. 3 is a diagram showing an example of the area determination table 3211.

FIG. 3 is a diagram showing an example of the area determination table 3211. The area determination table 3211 stores a correspondence of the condition and the area number related to the position of the object to be measured. The condition related to the position is represented, for example, based on a conditional expression, and in the example shown in FIG. 3, the conditional expression is described as a polar coordinate system based on the vehicle C. In other words, described are a distance R from the reference point provided on the vehicle C, and a condition of an angle θ of the object to be measured with the front direction of the vehicle C as zero degrees and the right side as true. The area numbers shown on the right side of FIG. 3 are the area numbers Z1 to Z3 shown in FIG. 2(b). In other words, the area determination table 3211 expresses the areas of the first area Z1, the second area Z2, and the third area Z3 shown in FIG. 2(b) based on conditional expressions.

The position determination unit 311 refers to the area determination table 3211 and determines the position, for example, in the following manner. For example, when the position of a certain object to be measured is expressed in a polar coordinate format, when the distance R from the reference point falls within a range of a predetermined threshold R1a to threshold R1A, and the angle θ from the reference direction falls within a threshold θ1a to a threshold θ1A, the position determination unit 311 determines that the object to be measured belongs to the first area Z1.

(Pre-processing Table 3212)

Figure 4:
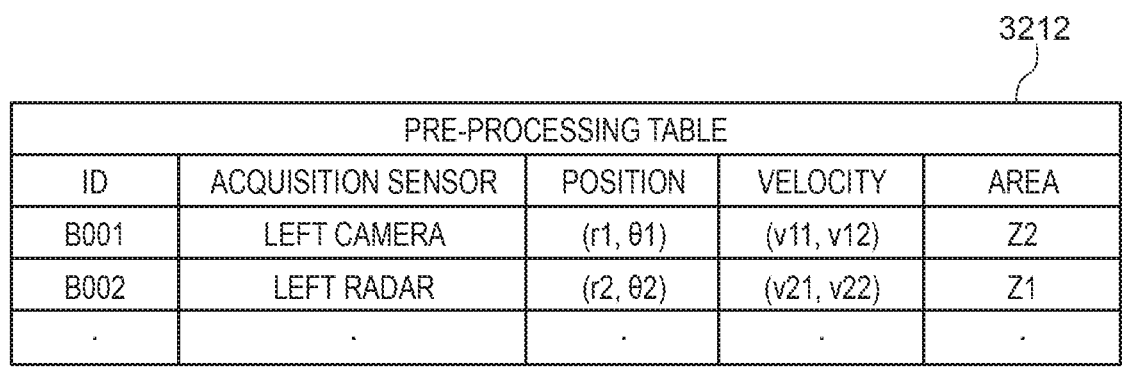
FIG. 4 is a diagram showing an example of the pre-processing table 3212.

FIG. 4 is a diagram showing an example of the pre-processing table 3212. The pre-processing table 3212 stores information that the I/O unit 33 acquired from the sensor group 1, and information created by the position determination unit 311. The pre-processing table 3212 stores the state quantities of the object to be measured before the fusion unit 312 performs the processing. The pre-processing table 3212 is configured from a plurality of records, and each record includes the fields of ID, acquisition sensor, position, velocity, and area. The ID field stores a convenient identifier for identifying the object to be measured. The identifier is, for example, a combination of "B" which indicates that it is pre-processing, and a serial number indicating the order that the object to be measured was acquired.

The acquisition sensor field stores the name of the sensor used when the I/O unit 33 acquired the state quantities. The fields of position and velocity store the state quantities acquired by the I/O unit 33. The velocity field stores the name of the area determined by the position determination unit 311. In other words, among the fields of the pre-processing table 3212, fields other than the area field are entered by the I/O unit 33, and only the area field is entered by the position determination unit 311.

(Post-processing Table 3213)

FIG. 5 is a diagram showing an example of the post-processing table 3213. The post-processing table 3213 stores the state quantities of the fused objects to be measured calculated by the first fusion unit 312A, the second fusion unit 312B, and the third fusion unit 312C. The post-processing table 3213 is configured from a plurality of records, and each record includes the fields of new ID, original ID, position, and velocity. The new ID field stores a convenient identifier for identifying the fused objects to be measured. The identifier is, for example, a combination of "A" which indicates that it is post-processing, and a serial number indicating the order that the object to be measured was calculated.

The original ID field stores an ID of the object to be measured used for creating the fused objects to be measured; that is, the value of the ID of the pre-processing table 3212. The fields of position and velocity store the position and the velocity of the fused objects to be measured. Note that the fields of new ID and original ID are provided merely for the sake of convenience, and the post-processing table 3213 does not need to include these fields.

(First Area Table 3221A)

FIG. 6 is a diagram showing an example of the first area table 3221A. The first area table 3221A mainly stores the state quantity of the object to be measured existing in the first area Z1 acquired by the sensor group 1. The first area table 3221A is configured from a plurality of records, and each record includes the records of ID, acquisition sensor, position, velocity, and matching. The fields of ID, acquisition sensor, position, and velocity store the same information as the pre-processing table 3212. The matching field stores an internal variable used by the first fusion unit 312A in performing the processing described later. The initial value of the matching field is "not yet matched". The first area table 3221A is created by the first fusion unit 312A extracting a record from the pre-processing table 3212 in which the area is "Z1". Note that, while the area field has been deleted in the example shown in FIG. 6, the area field may also be left as is.

The configuration of the first area table 3221A has been explained above, but the configuration of the second area table 3221B and the third area table 3221C is also the same as the configuration of the first area table 3221A. However, the second area table 3221B is created by the second fusion unit 312B, and mainly stores the state quantities of the object to be measured existing in the second area Z2. Moreover, the third area table 3221C is created by the third fusion unit 312C, and mainly stores the state quantities of the object to be measured existing in the third area Z3.

(Operation of Processing Unit 31)

Figure 7:
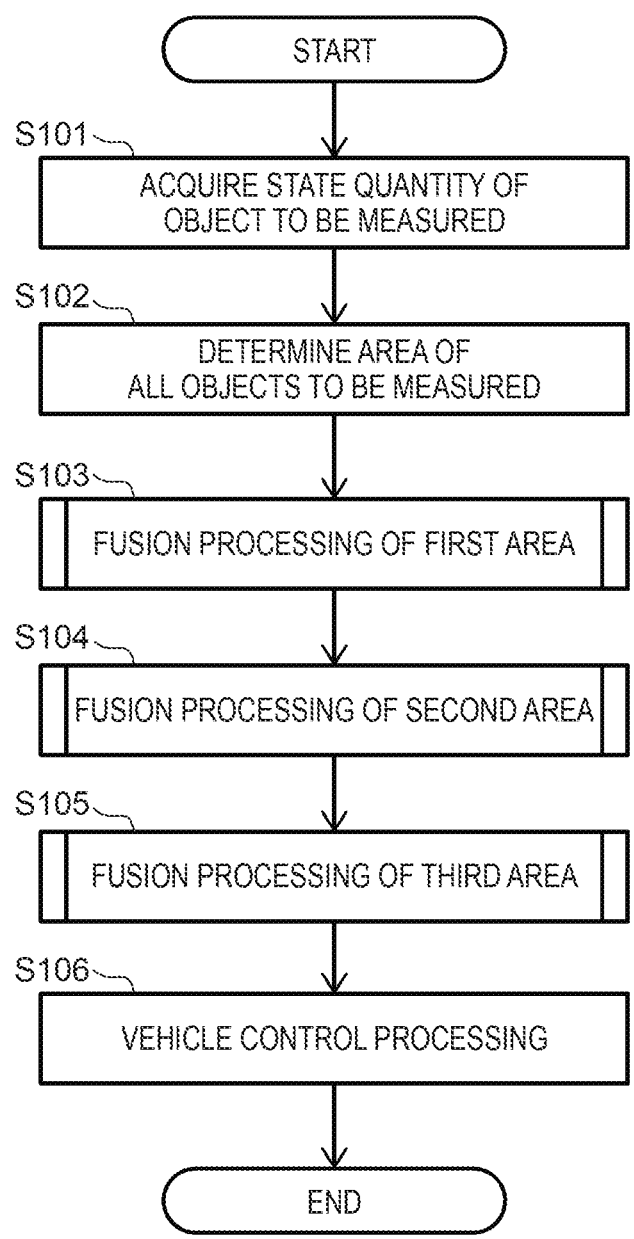
FIG. 7 is a flowchart showing the processing to be executed by the processing unit 31.

FIG. 7 is a flowchart showing the processing to be executed by the processing unit 31. The processing unit 31 executes the processing shown in FIG. 7 for each predetermined processing cycle, such as for every 100 ms. In the processing unit 31, the I/O unit 33 foremost acquires the state quantities of the object to be measured from the sensor group 1, and creates the pre-processing table 3212 (S101). Note that, at the time of S101, the area field of the pre-processing table 3212 is blank. Next, the position determination unit 311 of the processing unit 31 determines the area with each state quantity acquired in S101 as the processing target (S102). In other words, the position determination unit 311 determines the area of each record by referring to the position field of the pre-processing table 3212 and the area determination table 3211, and stores the name of the determined area in the area field of each record.

Next, the first fusion unit 312A performs fusion processing, as the processing target, only to the state quantities belonging to the first area Z1 among the state quantities acquired in S101 (S103). Next, the second fusion unit 312B performs fusion processing, as the processing target, only to the state quantities belonging to the second area Z2 among the state quantities acquired in S101 (S104). Next, the third fusion unit 312C performs fusion processing, as the processing target, only to the state quantities belonging to the third area Z3 among the state quantities acquired in S101 (S105).

Note that, while the details of S103 to S105 will be described later, the first fusion unit 312A, the second fusion unit 312B, and the third fusion unit 312C write the processing results in the post-processing table 3213. Moreover, here, while S103 to S105 are executed in order, the order of the steps may be interchanged or the steps may be executed in parallel. Finally, the vehicle control processing unit 313 refers to the post-processing table 3213 and determines the control processing of the vehicle C, and outputs an operation command to the actuator group 4. Note that the vehicle control processing unit 313 may also delete the information stored in the first area table 3221A, the second area table 3221B, and the third area table 3221C before the execution of S106 or after the execution of S106.

(Fusion Processing)

Figure 8:
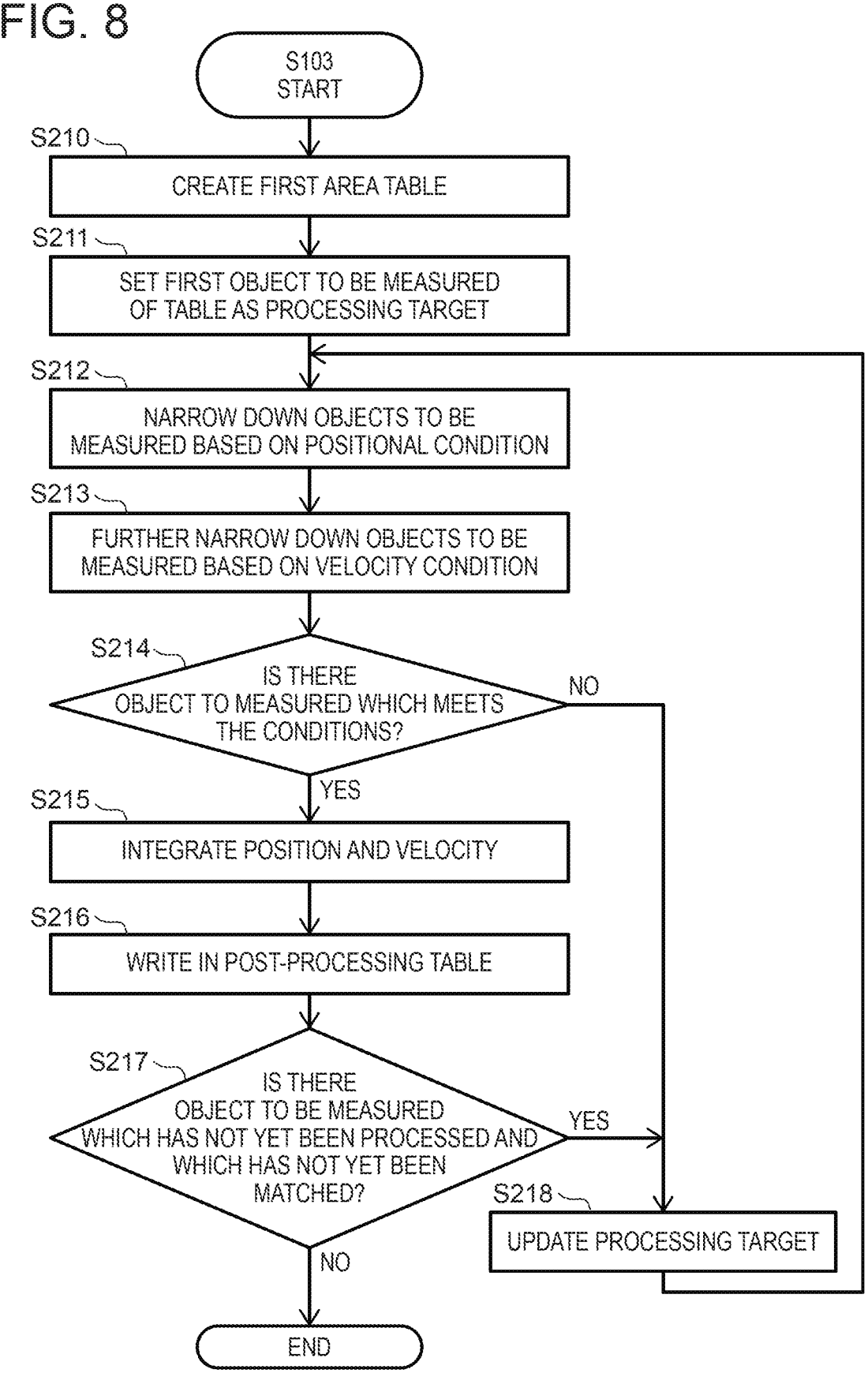
FIG. 8 is a flowchart showing the details of S103 of FIG. 7.

FIG. 8 is a flowchart showing the details of the fusion processing to be executed by the first fusion unit 312A; that is, the details of S103 of FIG. 7. Foremost, the processing unit 31 refers to the pre-processing table 3212, and creates the first area table 3221A by measuring the objects to be measured belonging to the first area Z1 (S210). Note that, as described above, the matching column of all objects to be measured in the first area table 3221A at the time of creation is "not yet matched".

Next, the processing unit 31 sets the object to be measured with the smallest ID as the processing target among the objects to be measured described in the first area table 3221A created in S210 (S211). Next, the processing unit 31 extracts, among the objects to be measured described in the first area table 3221A, an object to be measured in which the matching column is "not yet matched", the acquisition sensor is different from the objects to be measured as the processing target, and the difference in the position in comparison to the processing target is within a predetermined value (S212). Next, the processing unit 31 extracts, among the objects to be measured extracted in S212, an object to be measured in which the difference in the velocity in comparison to the objects to be measured as the processing target is within a predetermined value (S213).

Next, the processing unit 31 determines whether there is an object to be measured that was extracted in S213 (S214). When the processing unit 31 determines that there is an object to be measured that was extracted in S213; that is, there is another object to be measured which satisfies the conditions of S212 and S213 other than the objects to be measured as the processing target, the processing unit 31 proceeds to S215 upon determining that these objects to be measured are a match and proceeds to S215, and proceeds to S218 upon determining that there is no such other object to be measured that was extracted in S213. In S215, the processing unit 31 fuses the position and the velocity of the processing target and the object to be measured extracted in S213. The fusion is, for example, a simple average. Next, the processing unit 31 writes the computation result of S215 in the post-processing table 3213, and rewrites the matching columns of the objects to be measured as the processing target of the first area table 23221A and the object to be measured extracted in S213 to "matched" (S216).

Next, the processing unit 31 determines whether there is an object to be measured which is described in the area table 3221A, which is not a processing target, and in which the matching column is "not yet matched" (S217). When the processing unit 31 obtains a positive determination in S217, the processing unit 31 determines, as a new processing target, an object to be measured which is not yet a processing target and in which the matching column is "not yet matched" (S218), and returns to S212. The processing unit 31 ends the processing shown in FIG. 8 upon obtaining a negative determination in S217.

Note that, while the fusion processing to be executed by the first fusion unit 312A was explained in FIG. 8, since the fusion processing to be executed by the second fusion unit 312B and the third fusion unit 312C is also the same, the explanation thereof is omitted. However, there are the following differences; specifically, the second fusion unit 312B is to process only the objects to be measured belonging to the second area Z2, and the third fusion unit 312C is to process only the objects to be measured belonging to the third area Z3.

According to the foregoing first embodiment, the following operation and effect are yielded.

(1) An electronic control device comprises an I/O unit 33 which acquires state quantities including a position of an object to be measured using an output of a plurality of sensors included in a sensor group 1, a storage unit 32 which stores an area determination table 3211 as a condition of a classification related to the position, a position determination unit 311 which classifies the object to be measured by using the classification condition, and a fusion unit 312 which determines, by referring to the state quantities, a match among a plurality of the objects to be measured which are classified identically by the position determination unit 311 and which were measured by different sensors, and fuses the positions of the plurality of objects to be measured determined to be a match. The objects to be measured are objects that can be measured by each of the plurality of sensors.

The fusion unit 312 determines a match of the objects to be measured by targeting the objects to be measured which are classified identically by the position determination unit 311. Thus, since the targets for which a match with the objects to be measured is to be determined by the fusion unit 312 is limited to the classification by the position determination unit 311, the processing load of the fusion unit 312 can be reduced. Moreover, it is possible to increase the upper limit of the objects to be measured that can be processed by the electronic control device 3.

Here, a case where the position determination unit 311 does not perform the classification is referred to as a "comparative example", and the effect of the electronic control device 3 equipped in the position determination unit 311 is now explained. For example, considered is a case where the left camera LC, the right camera RC, the left radar LR, and the right radar RR respectively measure 10 objects to be measured; that is, a case where a total of 40 objects to be measured are measured. Here, in the comparative example, with regard to a certain object to be measured that is measured with the left camera LC, a match with a total of 30 objects to be measured, which were measured with the other three sensors, is determined. Thus, in a simple computation, since a match of each of the 40 objects to be measured with 30 objects to be measured is determined, 1200 combinations need to be considered in the comparative example. Meanwhile, when performing the classification based on the position determination unit 311, the total number of combinations will decrease since the combinations of the objects to be measured will be considered in the respective areas of the first area Z1 to the third area Z3.

Moreover, since the processing of the processing unit 31 is performed for each predetermined processing cycle, there is an upper limit in the number of combinations that can be considered. Even if the total number of objects to be measured, which were measured with the respective sensors, is the same, the number of combinations to be considered will be less in the electronic control device 3 in comparison to the comparative example. To put it differently, when the number of combinations that can be considered is the same in the comparative example and the electronic control device 3, the upper limit of the objects to be measured that can be processed with the electronic control device 3 will be greater.

(Modified Example 1)

The type and number of sensors configuring the sensor group 1 in the first embodiment, the data acquisition area of each sensor, and the defined areas are merely illustrations, and may differ from the first embodiment. The sensor group 1 only needs to include at least two sensors. The data acquisition areas of the respective sensors only need to overlap, in the least, at one location. The areas may be defined based on the data acquisition areas of the respective sensors, particularly based on the number of overlaps of the data acquisition areas with the other sensors. Moreover, the area determination table 3211 may be expressed in a format other than a table format, and the condition of the position may also be indicated as a mathematical expression. Furthermore, the area determination table 3211 may express the position with coordinates of a rectangular coordinate system.

(Modified Example 2)

The respective sensors included in the sensor group 1 may also directly output the sensor outputs to the electronic control device 3. In the foregoing case, the electronic control device 3 additionally comprises a state quantity calculation unit which calculates the state quantities of the objects to be measured by using the respective sensors. The state quantity calculation unit may be realized with the processing unit 31, or realized with a hardware circuit.

(Modified Example 3)

The electronic control device 3 may also be connected to an input device such as a mouse or a keyboard, and the operator's input that was input to the input device via the I/O unit 33 may be used in the rewriting of the information stored in the storage unit 32.

(Modified Example 4)

When the fusion processing is to be performed outside the electronic control device 3 and the operation result thereof is to be input to the electronic control device 3, the electronic control device 3 may omit such fusion processing. For example, a disparity image is created using the images output from the left camera LC and the right camera RC, and the created disparity image is input to the electronic control device 3. In the foregoing case, the disparity image may be created by either the left camera LC or the right camera RC, or created by another device.

According to modified example 4, by omitting the fusion processing to be performed by the electronic control device 3, the processing amount can be decreased, and the processing delay can be reduced. Moreover, since the processing power that is required by the electronic control device 3 will decrease, the production cost of the electronic control device 3 can be reduced.

Second Embodiment

The second embodiment of the electronic control device according to the present invention is now explained with reference to FIG. 9 to FIG. 12. In the following explanation, the same constituent elements as the first embodiment are given the same reference numeral, and the differences between the second embodiment and the first embodiment will be mainly explained. Any points that are not specifically explained are the same as the first embodiment. This embodiment differs from the first embodiment mainly with regard to the point that a plurality of patterns are described in the area determination table, and the pattern to be used is changed depending on the performance degradation of the sensor. Moreover, in this embodiment, the sensors are associated with the respective areas, and the respective areas may overlap.

(Configuration)

Figure 9:
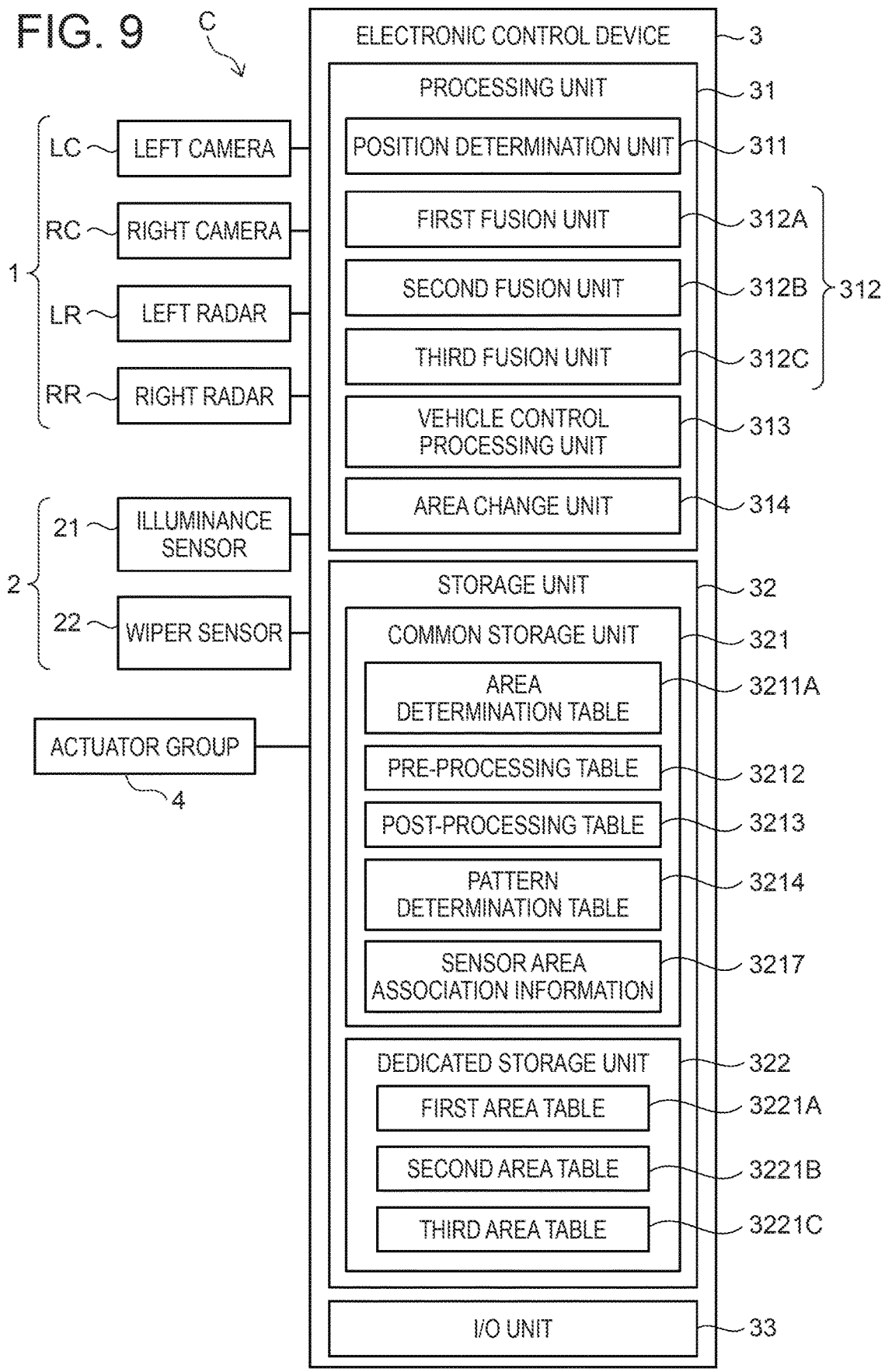
FIG. 9 is a diagram showing the configuration of the vehicle C in the second embodiment.

FIG. 9 is a diagram showing the configuration of the vehicle C in the second embodiment. In this embodiment, the vehicle C comprises all configurations of the first embodiment, and additionally comprises an illuminance sensor 21 which measures the ambient brightness, and a wiper sensor 22 which monitors the operation of the wiper of the vehicle C. However, in the following explanation, the illuminance sensor 21 and the wiper sensor 22 are collectively referred to as an environment monitor 2 as appropriate. The electronic control device 3 acquires the measured value of the environment monitor 2 by using the I/O unit 33. Moreover, in this embodiment, the common storage unit 321 additionally stores a pattern determination table 3214 and sensor area association information 3217, and stores an area determination table 3211A in substitute for the area determination table 3211. The processing unit 31 additionally includes an area change unit 314 as its function.

The area change unit 314 estimates the performance degradation of one or more sensors based on information of the state quantities of the object to be measured acquired from the sensor group 1 and the surrounding environment acquired from the environment monitor 2, and determines whether the estimated performance degradation corresponds to any of the plurality of patterns that are predetermined. This pattern is a pattern that defines the area. Performance degradation includes degradation in the amount of information and the quality of information obtained, and degradation of sensitivity. To put it differently, the area change unit 314 acquires the performance estimation information for estimating the performance degradation of the sensor group 1 from the sensor group 1 and the environment monitor 2. A higher-level conceptualization of the operation of the area change unit 314 will be as follows. In other words, the area change unit 314 identifies a sensor in which its performance has degraded by using the performance estimation information acquired by the I/O unit 33, and changes the coordinate condition of the area determination table 3211A so that the area associated with that sensor is narrowed.

The area determination table 3211A in the second embodiment describes the coordinate condition corresponding to the respective patterns determined by the area change unit 314. Note that, in the following explanation, the coordinate condition is also referred to as the "positional condition" as appropriate. Thus, in this embodiment, after the area change unit 314 foremost determines the pattern, the position determination unit 311 refers to the area determination table 3211A. In other words, the position determination unit 311 determines the areas of the respective objects to be measured based on the coordinate condition which is described in the area determination table 3211A and which corresponds to the pattern determined by the area change unit 314. Moreover, in this embodiment, the six areas of a second A area Z2A to a second F area Z2F are defined in substitute for the second area Z2 in the first embodiment, and a total of eight areas are defined.

Note that, while only one second fusion unit 312B is illustrated in FIG. 9, the second fusion unit 312B may process the six areas of the second A area Z2A to the second F area Z2F, or the fusion units to process the foregoing six areas may exist independently. In the foregoing case, the processing unit 31 will comprise a total of eight fusion units.

The pattern determination table 3214 describes information for determining to which of the plurality of patterns for defining the area the state of the sensor group 1 corresponds. As described above, since a plurality of patterns are described in the area determination table 3211A in this embodiment, the position determination unit 311 refers to the pattern determination table 3214 for determining which one of those patterns should be used.

The sensor area association information 3217 shows the association of the sensors regarding the respective areas, and at least two sensors are associated with each area. The fusion processing unit 312 refers to the sensor area association information 3217, and processes only the objects to be measured of the sensors associated with each area. Details will be described later.

(Pattern Determination Table 3214)

FIG. 10 is a diagram showing an example of the pattern determination table 3214. The pattern determination table 3214 describes a combination of a condition and an area pattern. The condition field describes the condition related to the performance of the sensor, and the area pattern field describes the name of the corresponding area pattern. For example, the first record of FIG. 10 shows that the area pattern will be "pattern B" when the illuminance E acquired from the illuminance sensor 21 is smaller than a predetermined threshold Ea. The next record shows that the area pattern will be "pattern C" when it is determined that the switch of the wiper has been turned ON from the output of the wiper sensor 22.

The next record shows that the area pattern will be "pattern D" when the velocity of the object to be measured output from the left camera LC is discontinuous. The continuity of the velocity of the object to be measured output from the left camera LC can be evaluated, for example, in the following manner. With regard to a certain object to be measured output from the left camera LC, let it be assumed that the previously measured time is t0, the previously measured position is R(t0), the previously measured velocity is V(t0), the currently measured time is t1, the currently measured position is R(t1), and the currently measured velocity is V(t1). Here, when Formula (1) below is satisfied continuously for a predetermined number-N of times regarding all objects to be measured of the left camera LC, it is determined that the velocity is discontinuous.

$$|R(t1)-\{R(t0)+V(t0)(t1-t0)\}|>\Delta R \ldots \quad (1)$$

The next record shows that, when it is determined that the left camera LC has failed, the area pattern will be "pattern D", which is the same as the immediately preceding record. The final record shows that the area pattern will be "pattern A" when the condition does not correspond to any of the cases; that is, when there is no particular problem with the sensor group 1. Note that the area pattern in the first embodiment corresponds to "pattern A". Moreover, while multiple patterns are indicated in the example shown in FIG. 10, there is no limitation in the number of patterns, and it will suffice so long as the number of patterns is two or more patterns.

(Area Determination Table 3211A)

FIG. 11 is a diagram showing an example of the area determination table 3211A in the second embodiment. The area determination table 3211A records a plurality of patterns regarding the positional condition. For example, in the example shown in FIG. 11, the two positional conditions of the pattern A and the pattern B are specified in the area determination table 3211A, and the specific values of the other patterns are omitted. The area determination table 3211A includes the coordinate conditions of all patterns described in the pattern determination table 3214.

(Sensor Area Association Information 3217)

FIG. 12 is a diagram showing an example of the sensor area association information 3217. The example shown in FIG. 12 depicts that the left camera LC and the left radar LR are associated with the first area Z1, two sensors selected from four sensors, specifically the left camera LC, the right camera RC, the left radar LR, and the right radar RR, are associated with the second A area Z2A to the second F area Z2F, and the right camera RC and the right radar RR are associated with the third area Z3.

Note that, with regard to the pattern D which is not illustrated in FIG. 11, the size of the first area Z1, the second A area Z2A, the second B area Z2B, and the second C area Z2C associated with the left camera LC will be equal to or less than the size of the areas of the pattern A, and the size of areas other than the foregoing areas not associated with the left camera LC will increase. For example, in the pattern D, the first area Z1 will be narrower in comparison to the pattern A, the planar dimensions of the second A area Z2A to the second F area Z2F will not change, and the planar dimension of the third area Z3 will be broader.

(Operation of Processing Unit 31)

Figure 13:
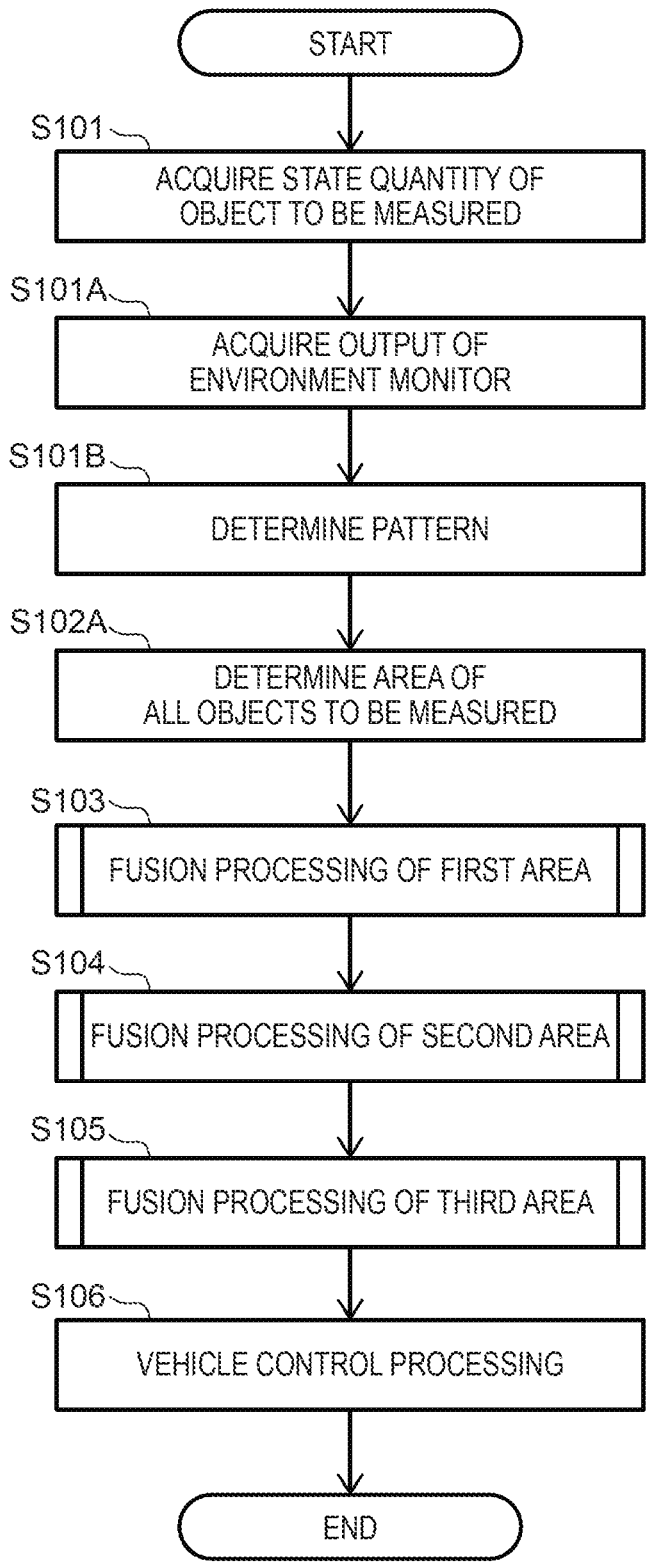
FIG. 13 is a flowchart showing the processing of the processing unit 31 in the second embodiment.

FIG. 13 is a flowchart showing the processing of the processing unit 31 in the second embodiment. The differences in comparison to the processing shown in FIG. 7 of the first embodiment are that S101A and S101B have been added between S101 and S102, and that S102 has been changed to S102A. The differences in comparison to the first embodiment are now explained.

In S101A, the I/O unit 33 receives the output of the environment monitor 2. In subsequent S101B, the area change unit 314 refers to the information acquired in S101 and S101A, and the pattern determination table 3214, and determines an area pattern. In S102A, the position determination unit 311 uses the positional condition identified based on the area pattern determined in S101B and the area determination table 3211A, and determines the area to which belongs the processing target acquired in S101.

(Fusion Processing)

The operation of the fusion unit 312 in the second embodiment differs from the first embodiment with respect to the point that the processing target is determined by also giving consideration to the sensor area association information 3217. For example, the first fusion unit 312A sets, as the processing target, the object to be measured in which the position of the processing target is the first area Z1 and in which the sensor that acquired the processing target is associated with the first area in the sensor area association information 3217. When expressing the flowchart of the operation of the first fusion unit 312A in the second embodiment, S210 of FIG. 8 may be changed as follows.

In other words, in S210, the first fusion unit 312A refers to the pre-processing table 3212 and the sensor area association information 3217, and creates a first area table 3221A by extracting an object to be measured which belongs to the first area Z1 and in which the acquisition sensor is the left camera LC or the left laser LR. Note that, in the first embodiment, when the position of the object to be measured acquired by the right camera RC is the first area Z1, it was explained that the processing may be performed by giving consideration to, or ignoring, the information of that object to be measured. However, in this embodiment, the object to be measured in the first area Z1 acquired by the right camera RC will be ignored.

According to the foregoing second embodiment, the following operation and effect are yielded.

(2) Respective areas classified based on the area determination table 3211A are associated with at least two sensors among a plurality of sensors. The fusion unit 312 determines, by referring to the state quantities, a match among the plurality of objects to be measured which are classified as being in the same area by the position determination unit 311 and which were measured by different sensors associated with the same area, and fuses the positions of the plurality of objects to be measured determined to be a match. The electronic control device 3 comprises an I/O unit 33 which acquires performance estimation information for estimating degradation in performance of each of the plurality of sensors, and an area change unit 314 which changes the area to be referenced by the area determination table 3211A so that the area associated with the sensor, in which the performance has degraded, is narrowed by using the performance estimation information.

For example, since the pattern D is selected as the area pattern when it is determined that the performance of the left camera LC has degraded, the first area Z1 associated with the left camera LC is narrowed, and the third area Z3 which is not associated with the left camera LC is broadened. Thus, the size of the area that uses the left camera LC in which the performance has degraded is decreased so that the fusion processing using the detection result of a sensor with a relatively high sensor performance, in comparison to the sensor performance before changing the area, is more likely to be selected. Accordingly, the electronic control device 3 can select the fusion processing using a detection result of a sensor having a relatively high sensor performance without increasing the overall processing amount. Thus, even when there is a change in the sensor performance, a high level of safety can be ensured with a smaller processing amount.

Moreover, the pattern C is selected when the wiper switch is ON, and the area associated with at least either the left camera LC or the right camera RC is narrowed. Specifically, the following three configurations can be considered. The first configuration is setting only the second F area Z2F associated with the left radar LR and the right radar RR as a non-empty set, and setting the other areas as an empty set. In other words, in the first configuration, the planar dimension of areas other than the second F area Z2F is zero. The second configuration is setting only the second C area Z2C associated with the left camera LC and the right camera RC as an empty set, and setting the other areas to be the same as the pattern A. The third configuration is a setting that is in the middle of the first configuration and the second configuration. The reason for this is explained below.

When the wiper switch is ON, it is most likely raining. Furthermore, while a camera is easily affected by rain, a millimeter wave radar is not easily affected by rain. Thus, the three configurations described above may be adopted in order to utilize the left radar LR and the right radar RR which are not easily affected by rain.

(3) The storage unit 32 stores a pattern determination table 3214 which prescribes a correspondence of the degradation in performance of the plurality of sensors included in the sensor group 1 and the condition of the classification. The area change unit 314 determines a pattern included in the pattern determination table 3214 by using the performance estimation information. Thus, the area can be changed easily.

(Modified Example 1 of Second Embodiment)

The environment monitor 2 may be substituted with the sensor group 1. In other words, if the conditions described in the pattern determination table 3214 can be determined using the output of the sensor group 1, the electronic control device 3 does not need to comprise the environment monitor 2. Furthermore, when the CPU configuring the processing unit 31 has the function of a clock or a calendar, the electronic control device 3 may use the output of the processing unit 31 for the determination of the pattern determination table 3214.

(Modified Example 2 of Second Embodiment)

In the foregoing second embodiment, a plurality of patterns were registered in the area determination table 3211A in advance. Nevertheless, the electronic control device 3 may also determine the respective areas based on operation without comprising the area determination table 3211A. For example, the processing unit 31 may additionally comprise a Kalman filter which estimates an error included in the observed amount of the respective sensors included in the sensor group 1, and the area change unit 314 may determine the respective areas based on the size of the error estimated by the Kalman filter. In the foregoing case also, based on the same concept as the second embodiment, the area associated with the sensor in which the estimated error is great is narrowed, and the area associated with the sensor in which the estimated error is small is broadened. In other words, in this modified example, the size of the area can be flexibly changed according to the size of the error.

(Modified Example 3 of Second Embodiment)

In the second embodiment, the sensor and the area were associated with the sensor area association information 3217. Nevertheless, the sensor may also be associated with the respective fusion units 312. In the foregoing case, the fusion units 312 will be configured, for example, from eight fusion units (first fusion unit to eighth fusion unit), and each fusion unit will be associated with a different area.

Third Embodiment

The third embodiment of the electronic control device according to the present invention is now explained with reference to FIG. 14 to FIG. 17. In the following explanation, the same constituent elements as the first embodiment are given the same reference numeral, and the differences between the third embodiment and the first embodiment will be mainly explained. Any points that are not specifically explained are the same as the first embodiment. This embodiment differs from the first embodiment mainly with regard to the point that the future positions of the fused objects to be measured are estimated, and the estimated future positions are also subject to the fusion processing.

(Configuration)

Figure 14:
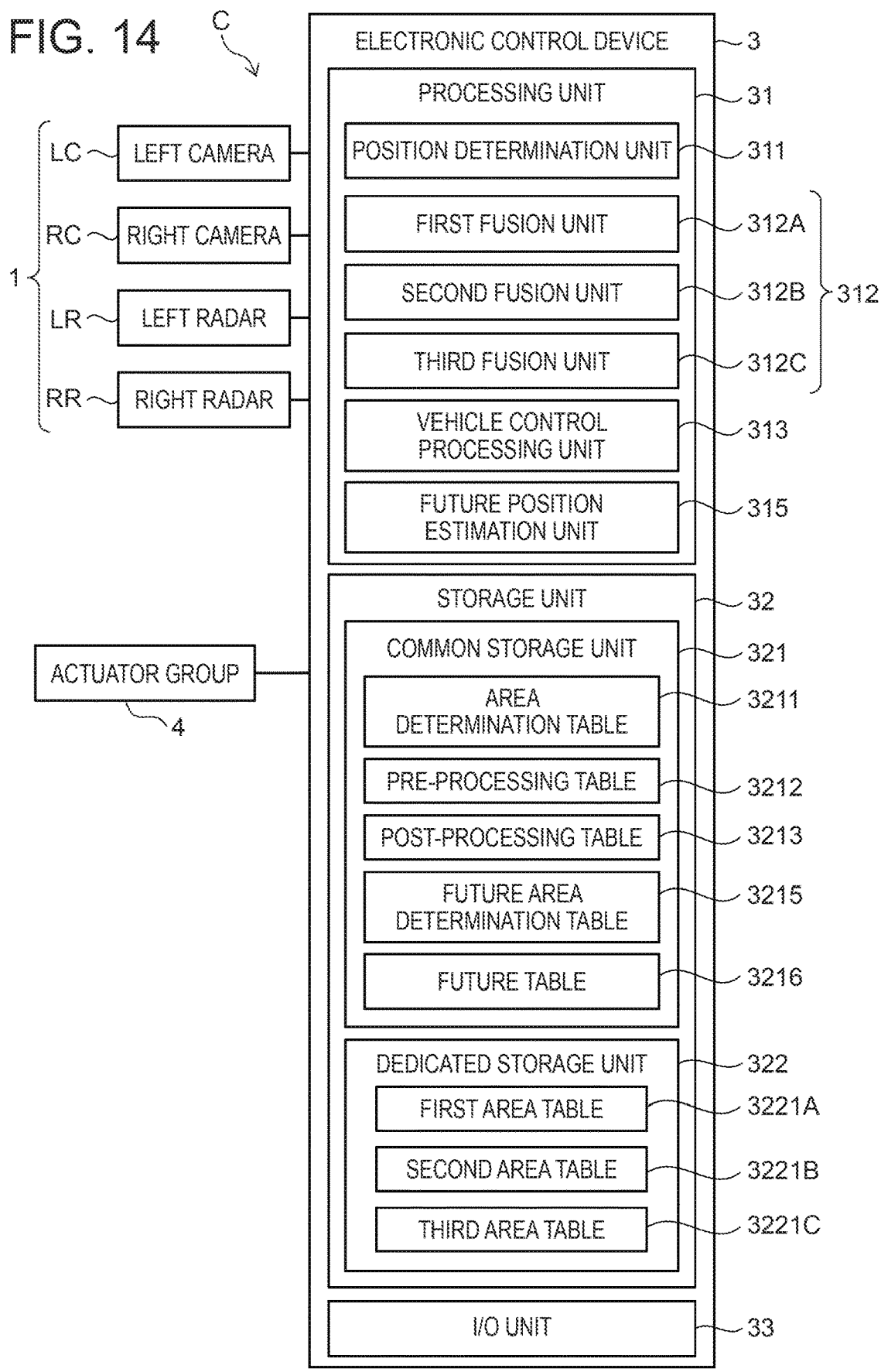
FIG. 14 is a diagram showing the configuration of the vehicle C in the third embodiment.

FIG. 14 is a diagram showing the configuration of the vehicle C in the third embodiment. In this embodiment, the electronic control device 3 further comprises a future position estimation unit 315 in the processing unit 31 in addition to the configuration of the first embodiment. Moreover, the storage unit 32 additionally stores a future area determination table 3215, and a future table 3216.

The future position estimation unit 315 estimates the state quantities of the future based on the fused state quantities described in the post-processing table 3213, and writes the result in the future table 3216. In the following explanation, the position included in the state quantities estimated by the future position estimation unit 315 is referred to as the "future position". For example, the future position estimation unit 315 calculates the difference of the positions by using the time interval for each processing cycle and the velocity of the fused state quantities, and estimates the future position based on the position of the fused state quantities and the calculated difference. The future position estimation unit 315 may set, for example, the future velocity as the velocity of the fused state quantities. Furthermore, the future position estimation unit 315 determines whether the estimated position corresponds to any area described in the future area determination table 3215, and stores the determination result in the future area determination table 3215.

When the time of the current processing cycle is t1, the time of the next processing cycle is t2, the position of the fused state quantities is R(t1), and the velocity of the fused state quantities is V(t1), for example, the future position estimation unit 315 may also calculate the future position R(t2) as shown in Formula (2) below.

$$R(t2)=R(t1)+V(t1)(t2-t1) \ldots \quad (2)$$

(Future Area Determination Table 3215)

FIG. 15 is a diagram showing an example of the future area determination table 3215. The future area determination table 3215 stores the future positions of the fused objects to be measured; that is, the correspondence of the condition and the area number related to the position estimated by the future position estimation unit 315 is stored therein. The configuration of the future area determination table 3215 is the same as the area determination table 3211. The area numbers included in the future area determination table 3215 are the same as the area determination table 3211, and the positional conditions may be the same as, or different from, the area determination table 3211.

(Future Table 3216)

FIG. 16 is a diagram showing an example of the future table 3216. The future table 3216 stores the future state quantities of the fused objects to be measured, and the classification of the future positions of the fused objects to be measured. The future table 3216 is written by the future position estimation unit 315.

(Operation of Processing Unit 31)

Figure 17:
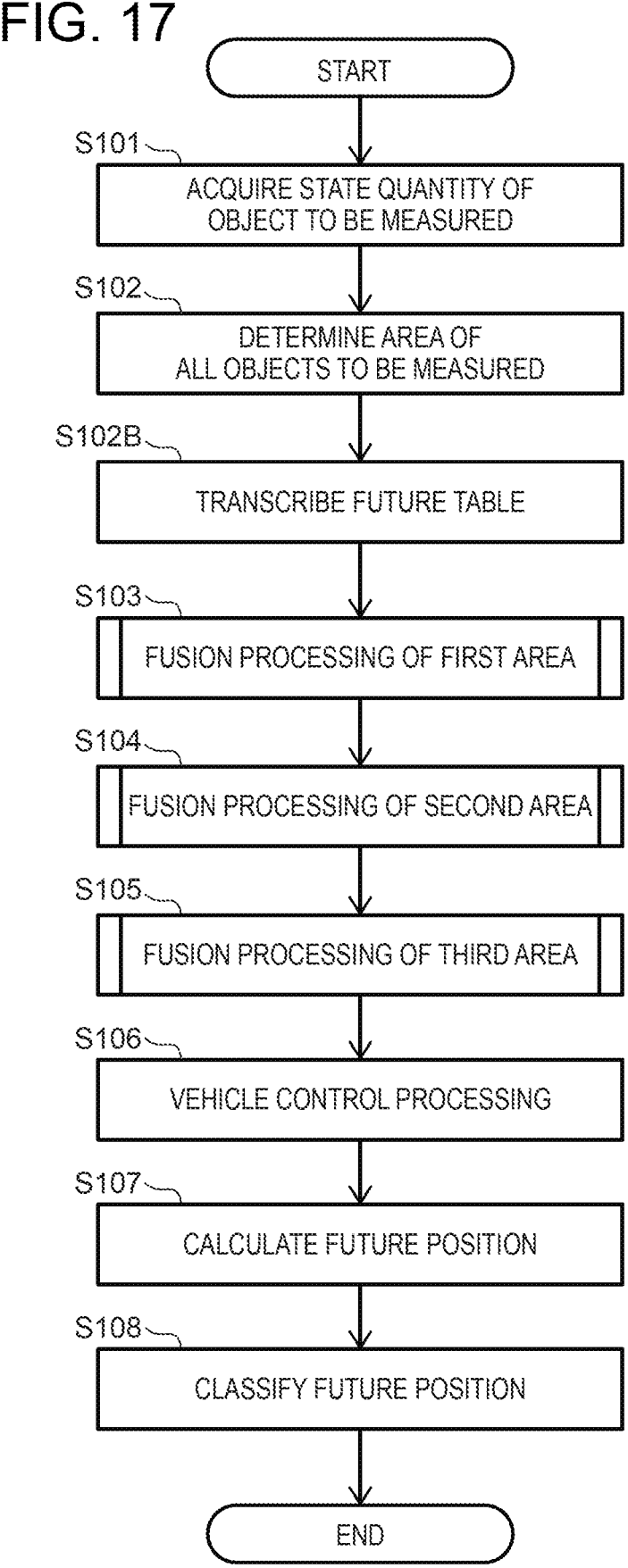
FIG. 17 is a flowchart showing the processing of the processing unit 31 in the third embodiment.

FIG. 17 is a flowchart showing the processing of the processing unit 31 in the third embodiment. The differences in comparison to the processing shown in FIG. 7 of the first embodiment are that S102B has been added after S102, and S107 and S108 have been added after S106. The differences in comparison to the first embodiment are now explained.

In S102B, the future position estimation unit 315 transcribes the future table 3216; that is, reads the overall future table 3216, and records, in the corresponding area table, the respective records according to the value of the area number field. For example, in the example shown in FIG. 16, since the top two records both have a future area of "Z2", the information of these records is recorded in the second area table 3221B. However, the value of the acquisition sensor field to be written in the area table in S102B is set to be a value that differs from the respective sensors, such as "fusion". Once the future position estimation unit 315 reads the overall future table 3216, the future position estimation unit 315 deletes all information that was stored in the future table 3216.

In S107, the future position estimation unit 315 calculates the state quantities in the next processing cycle including the future positions of all fused processing targets described in the post-processing table 3213, and describes the result in the future table 3216. In subsequent S108, the future position estimation unit 315 refers to the future table 3216 and the future area determination table 3215, classifies the future positions, and enters the result in the area number field of the future table 3216. More specifically, the future position estimation unit 315 determines whether the future positions correspond to any area described in the future area determination table 3215, and enters the determination result in the area number field of the future table 3216. This concludes the explanation of FIG. 17.

Note that the fusion processing in the respective areas shown in S103 to S105 is the same as the first embodiment, but substantially varies as follows due to the influence of S102B. For example, the first fusion unit 312A extracts the state quantities, including the future position, in S212 of FIG. 8, and in S214 includes, as the fusion target, the future positions that satisfy the conditions of S212 and S213. In S214, the processing unit 31 may use a simple average as with the first embodiment, or use a weighted average in which the weight is changed between the estimated positions and the other positions.

According to the foregoing third embodiment, the following operation and effect are yielded.

(4) The storage unit 32 stores a future area determination table 3215 as a condition of a classification related to a future position, which is a future position of the object to be measured, and a future table 3216 including the future position in which the future area was classified by the future area determination table 3215. The processing unit 31 comprises a future position estimation unit 315 which estimates the future position of the object to be measured, and classifies the future position by using the future area determination table 3215. The fusion unit 312 also includes, in targets to be determined, the objects to be measured which are classified identically by the future position estimation unit 315 in the determination of a match of the objects to be measured, and fuses the positions and the future positions of the plurality of objects to be measured determined to be a match.

Generally speaking, in order to improve the accuracy of the fused objects to be measured, it would be effective to include the estimated values based on past measured values in the targets of fusion processing. Nevertheless, the number of combinations will increase considerably pursuant to the increase in the number of processing targets, and there is a problem in that the processing amount will increase and the number of objects to be measured that can be processed within the processing cycle will decrease. Thus, the electronic control device 3 determines the area of the calculated future positions, and limits the combinations to be within the same area. Thus, the accuracy of the state quantities of the fused objects to be measured can be improved while suppressing the increase in the processing load.

(5) The future position estimation unit 315 estimates the future positions of the objects to be measured fused by the fusion unit 312. Thus, the state quantities of the objects to be measured in the subsequent processing cycle can be calculated with high accuracy by using the future positions of the state quantities calculated using a plurality of sensor outputs.

(Modified Example 1 of Third Embodiment)

In substitute for writing the estimated future positions in the future table 3216, the future position estimation unit 315 may also write the estimated future positions in one among the first area table 3221A, the second area table 3221B, and the third area table 3221C. In other words, the future position estimation unit 315 writes the future positions in one among the first area table 3221A, the second area table 3221B, and the third area table 3221C according to the area in which the calculated future positions are classified. In the foregoing case, S102B of FIG. 17 may be deleted.

(Modified Example 2 of Third Embodiment)

In the foregoing third embodiment, the estimation target of the state quantities was only the fused objects to be measured. Nevertheless, the future position estimation unit 315 may also set the estimation target of the state quantities to be only the objects to be measured that have not been fused, or set the estimation target of the state quantities to be both the fused objects to be measured and the non-fused objects to be measured.

Furthermore, the future position estimation unit 315 may perform the following processing in substitute for writing the estimated state quantities in the future table 3216. In other words, the future position estimation unit 315 may also classify the future positions of the objects to be measured that have not been fused by referring to the future area determination table 3215, and write the result in one among the first area table 3221A, the second area table 3221B, and the third area table 3221C corresponding to the classified area. It could be said that the processing in the foregoing case is the processing of deleting the objects to be measured determined as moving to a different area from the area table of the movement source, and moving it to the area table of the movement destination.

According to this modified example, the following operation and effect are yielded.

(6) The position determination unit 311 and the future position estimation unit 315 store results of the classification in an associated area of the dedicated storage unit 322 for each result of the classification determined with reference to the area determination table 3211A and the future table 3216. Thus, there is no need to transcribe the state quantities from the future table 3216 to the dedicated storage unit 322, and the processing can thereby be simplified.

In each of the embodiments and modified examples explained above, the programs of the electronic control device 3 are stored in the ROM, but the programs may also be stored in the storage unit 32. Moreover, the programs may also be read from another device via the I/O interface and a medium that can be used by the electronic control device 3. Here, as the medium, for example, used may be a storage medium that can be attached to and detached from an I/O interface, or a communication medium such as a wired, wireless or optical network, or carrier waves or digital signals that are transmitted on such network. Moreover, a part or all of the functions realized by the programs may be realized with a hardware circuit or FPGA.

Each of the embodiments and modified examples described above may respectively be combined. While various embodiments and modified examples were explained above, the present invention is not limited to the subject matter thereof. Other modes considered to fall within the technical concept of the present invention also fall within the scope of the present invention.

The disclosure of the following priority application is incorporated herein by way of reference.

Japanese Patent Application No. 2018-84266 (filed on Apr. 25, 2018)

REFERENCE SIGNS LIST

1 . . . sensor group
2 . . . environment monitor
3 . . . electronic control device
4 . . . actuator group
31 . . . processing unit
32 . . . storage unit
33 . . . I/O unit
311 . . . position determination unit
312 . . . fusion unit
313 . . . vehicle control processing unit
314 . . . area change unit
315 . . . future position estimation unit
321 . . . common storage unit
322 . . . dedicated storage unit
3211 . . . area determination table
3212 . . . pre-processing table
3213 . . . post-processing table
3214 . . . pattern determination table
3215 . . . future area determination table
3216 . . . future table
3221A . . . first area table
3221 B . . . second area table
3221C . . . third area table
C . . . vehicle

The invention claimed is:

1. An electronic control device, comprising:
a sensor information acquisition unit which acquires state quantities including a position of an object to be measured using an output of a plurality of sensors, or calculates the state quantities of the object to be measured by using the output of the plurality of sensors;
a storage unit which stores
 position determination information as a condition of a classification related to the position,
 a future classification condition as a condition of a classification related to a future position, which is a future position of the object to be measured, and
 a classified future position as the future position of the object to be measured which was classified by the future classification condition;
a position determination unit which classifies the object to be measured by using the position determination information;
a fusion unit which determines, by referring to the state quantities, a match among a plurality of the objects to be measured which are classified identically by the position determination unit and which were measured by different sensors, and fuses the positions of the plurality of objects to be measured determined to be a match, wherein
 the objects to be measured are objects that can be measured by each of the plurality of sensors; and
a future position estimation unit which estimates the future position of the object to be measured, and classifies the future position by using the future classification condition, wherein
 the fusion unit also includes, in targets to be determined, the objects to be measured which are classified identically by the future position estimation unit in the determination of a match of the objects to be measured, and fuses the positions and the future positions of the plurality of objects to be measured determined to be a match.

2. The electronic control device according to claim 1, wherein:
respective areas classified based on the position determination information are associated with at least two sensors among the plurality of sensors;
the fusion unit determines, by referring to the state quantities, a match among the plurality of objects to be measured which are classified as being in the same area by the position determination unit and which were measured by different sensors associated with the same area, and fuses the positions of the plurality of objects to be measured determined to be a match;

the fusion unit comprises:

a performance estimation information acquisition unit which acquires performance estimation information for estimating degradation in performance of each of the plurality of sensors; and an area change unit which changes the position determination information so that the area associated with the sensor, in which the performance has degraded, is narrowed by using the performance estimation information.

3. The electronic control device according to claim 2, wherein:

the storage unit additionally stores pattern determination information which prescribes a plurality of the conditions of the classification, and a correspondence of the degradation in performance of the plurality of sensors and the conditions of the classification; and the area change unit determines which one of the conditions of the classification included in the pattern determination information is to be used by using the performance estimation information.

4. The electronic control device according to claim 1, wherein:

the future position estimation unit estimates at least one of either the future positions of the objects to be measured fused by the fusion unit, or the future positions of the objects to be measured for which the state quantity was acquired by the sensor information acquisition unit.

5. The electronic control device according to claim 1, wherein:

the position determination unit and the future position estimation unit store results of the classification in an associated area of the storage unit for each result of the classification.

6. An operation method to be executed by an electronic control device comprising a sensor information acquisition unit which acquires state quantities including a position of an object to be measured using an output of a plurality of sensors, or calculates the state quantities of the object to be measured by using the output of the plurality of sensors, and a storage unit which stores
position determination information as a condition of a classification related to the position,
a future classification condition as a condition of a classification related to a future position, which is a future position of the object to be measured, and
a classified future position as the future position of the object to be measured which was classified by the future classification condition;

wherein the operation method comprises:

classifying the object to be measured by using the position determination information;

determining, by referring to the state quantities, a match among a plurality of the objects to be measured which are classified identically based on the classification and which were measured by different sensors, and fusing the positions of the plurality of objects to be measured determined to be a match, wherein the objects to be measured are objects that can be measured by each of the plurality of sensors; and estimating the future position of the object to be measured, and classifying the future position by using the future classification condition, wherein in the classification, the future positions which are classified identically are included in targets to be determined in the determination of a match of the objects to be measured, and the positions and the future positions of the plurality of objects to be measured determined to be a match are fused.

7. The operation method according to claim 6, wherein:

the storage unit additionally stores sensor area association information as an association with at least two sensors among the plurality of sensors with regard to respective areas classified based on the condition of the classification;

in the fusion, a match among the plurality of objects to be measured which are classified as being in the same area based on the classification and which were measured by different sensors associated with the same area based on the sensor area association information is determined, and the positions of the plurality of objects to be measured determined to be a match are fused;

the operation method additionally comprising:

acquiring performance estimation information for estimating degradation in performance of each of the plurality of sensors; and changing the position determination information so that the area associated with the sensor, in which the performance has degraded, is narrowed by using the performance estimation information.

8. The operation method according to claim 7, wherein:

the storage unit additionally stores pattern determination information which prescribes a plurality of the conditions of the classification, and a correspondence of the degradation in performance of the plurality of sensors and the conditions of the classification; and the operation method additionally comprises:

determining which one of the conditions of the classification included in the pattern determination information is to be set as the new position determination information by using the performance estimation information.

9. The operation method according to claim 6, wherein:

in the estimation of the future position, at least one of either the future positions of the objects to be measured that were fused, or the future positions of the objects to be measured for which the state quantity was acquired, are estimated.

10. The operation method according to claim 6, wherein:

the state quantity and the future position that underwent the classification are stored in an associated area of the storage unit for each result of the classification.

* * * * *